UNITED STATES PATENT OFFICE.

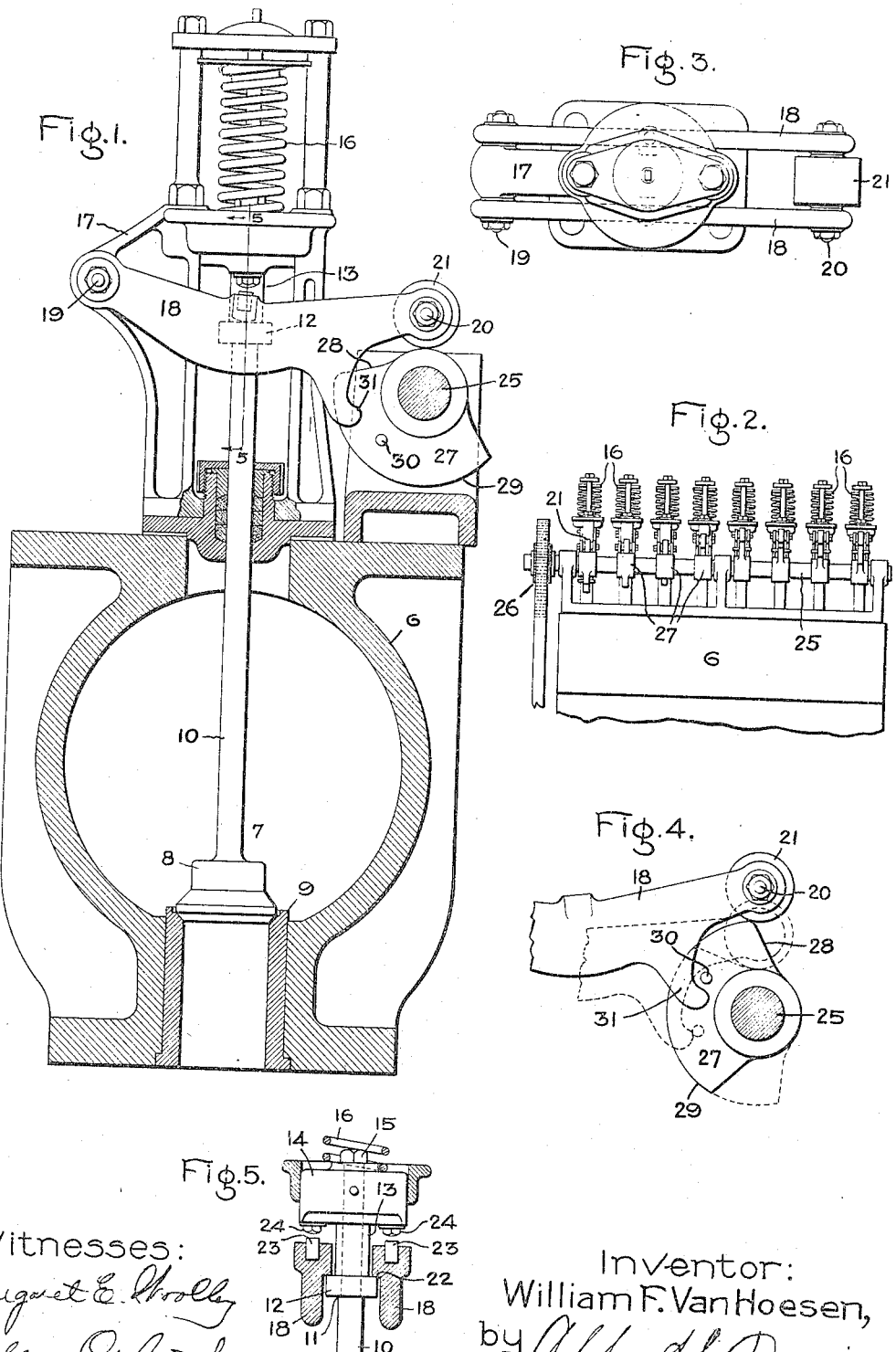

WILLIAM F. VAN HOESEN, OF SCHENECTADY, NEW YORK, ASSIGNOR TO GENERAL ELECTRIC COMPANY, A CORPORATION OF NEW YORK.

VALVE-OPERATING MECHANISM.

1,133,343.  Specification of Letters Patent.  Patented Mar. 30, 1915.

Continuation in part of application Serial No. 851,564, filed July 17, 1914. This application filed November 12, 1914. Serial No. 871,707.

*To all whom it may concern:*

Be it known that I, WILLIAM F. VAN HOESEN, a citizen of the United States, residing at Schenectady, in the county of Schenectady, State of New York, have invented certain new and useful Improvements in Valve-Operating Mechanisms, of which the following is a specification.

This application is a continuation in part of my application, Serial No. 851,564, filed July 17, 1914.

The present invention relates to valve operating means for the valve mechanism of elastic fluid turbines, particularly of the type having a series of nozzle valves which are successively opened and closed as the load increases and decreases, although it is not necessarily limited thereto.

When a steam turbine is operated continuously for a long time, as is frequently the case, the nozzle valves, particularly those to open first, may be held continuously in open position during the entire time, and their stems are liable to become coated with mud and other impurities which may cause them to stick and tend to prevent prompt and complete seating of the valves. This is a dangerous condition of things, because with a condensing turbine it requires only a small amount of steam to cause the machine to run away when the load is removed, as for instance, by the opening of the circuit breaker in the main leads. At such times it is absolutely essential that the valves should close quickly and tightly so that not a pound of steam can reach the turbine. For this reason it is desirable to provide in addition to, or in lieu of, the usual springs used to bias the valves to closed position, a positive means for closing the same which will be powerful enough to overcome any sticking of the valve or valves due to the collection of mud or sediment, or to other reasons.

The object of the present invention is to provide an improved arrangement for positively actuating a valve or valves, as the nozzle valve or valves of an elastic fluid turbine, in the closing, as well as in the opening movement.

For a consideration of what I believe to be novel and my invention, attention is directed to the following description and the claims appended thereto.

In the accompanying drawing, Figure 1 is a sectional elevation of a turbine valve mechanism embodying my invention; Fig. 2 is a fragmentary view of the nozzle valve mechanism of an elastic fluid turbine; Fig. 3 is a top plan view of a valve operating mechanism; Fig. 4 is an enlarged view of a detail; and Fig. 5 is a section taken on line 5—5, Fig. 1.

Referring to the drawing, 6 indicates the steam chest of an elastic fluid turbine in which are arranged the usual nozzle valves 7. Each valve comprises a valve head 8 which seats on a valve seat 9, and a stem 10. The upper end of the stem is reduced in diameter to form a shoulder 11 against which rests a collar 12. Supported on the collar is a spacing sleeve 13 upon which rests a head 14. These parts are held in position on the stem by a nut 15 threaded on the end of the stem or by other suitable means. The collar 12 and head 14 form spaced abutments on the upper end of the stem.

16 is a closing spring supported in a suitable bracket 17. The spring presses against the head 14 to bias the valve to closed position. The valves are successively lifted against the springs by suitable levers raised by cams. In the present instance each lever is shown as comprising two arms 18 pivoted at 19 to the adjacent bracket 17. These arms project one on each side of the valve stem between the head 14 and the collar 12, and have their ends joined by a pin 20 carrying an anti-friction roller 21. On the inner surface of each arm adjacent the stem is a shoulder or projection 22 adapted to engage with the collar 12. The arms have pins 23 set in them which act against the heads of threaded bolts 24 in head 14 in opening the valve, and the projections 22 may engage collar 12 to positively close the valve.

25 indicates a cam shaft oscillated through a rack and pinion 26 by means of a suitable mechanism controlled by the speed governor as is well known. On this cam shaft are a series of cams 27 which engage the rollers 21. Each cam has an active face 28 to lift its lever arms and open the corresponding valve and a holding face 29 concentric with the cam shaft to maintain the valve in its open position during further angular movement of the shaft. The active faces of the cams are angularly disposed around the cam shaft so as to successively open the nozzle valves. The arrangement so far described comprises a known construction of turbine valve mechanism, and is a form in connection with which my invention may be advantageously employed.

My invention comprises the provision of means whereby the cams are adapted to positively actuate their levers in closing as well as in opening the valves. It may be applied to each cam or only to some of them, and in one aspect it may be considered as being supplemental to the usual closing springs, acting to positively start the valve or force it to its seat in case the closing spring is insufficient. It forms in substance, however, a means for positively insuring the closing of the valve to which it is applied when the valve is released by the cam to permit it to close.

In the present embodiment my invention comprises a pin 30 projecting laterally from both sides of the cam and a hook 31 on each arm of the lifting lever coöperating with said pin, whereby when the cam raises the lever arms the pin will pass to a position just above the hooks and thus be ready, if necessary, to force the lever arms down when the cam turns backward, causing the friction roller on the lever arms to ride down the active face of the cam and the valve to seat. These operations are well shown in the drawing. In Fig. 1, the valve is closed and the roller 17 is resting on the hub of the cam. The dotted lines in Fig. 4 show the cam turned forward until its active face is just about to lift the lever arms. The pin has been carried past the tip of the hooks, which in the further rotation of the cam will be thrust in under the pin and follow it upward until the roller arrives at the holding face of the cam, as shown in full lines in Fig. 4. The cam can now rotate forward as far as may be necessary, carrying the pin with it, but upon its return to this position in full lines in Fig. 4, the pin will be in osition to engage the hooks. If now upon urther backward rotation of the cam, the spring fails to cause the valve to move toward its seat, and the arms to move downward keeping the roller upon the surface of the cam, then the pin will engage the hooks and pull them down so as to compel the roller to follow the contour of the cam and the lever to drop thus positively moving the valve to closed position. At this point the roller will rest once more on the hub of the cam and the hooks and the pin will part company, by reason of the divergence of the intersecting circular paths in which they move, so that further backward rotation of the cam is not prevented.

It will be noted that in the present embodiment of my invention there is a limited amount of play in the connection between the abutments on the valve stem and the operating lever, and that in normal operation so long as the roller follows the surface of its cam, the pin does not engage the hooks, although it follows down close to it. When the valve tends to stick open, however, the lever will only follow the cam until its projections 22 engage with collar 12 taking up the lost motion in the connection. Further movement of the cam then moves it slightly away from the roller and brings the pin into engagement with the hooks foreing the valve toward its seat as already described. It is to be understood, however, that my invention is not necessarily limited to this specific arrangement, nor to use only in connection with the admission nozzle valve or valves of the turbine, as it may find application in connection with any valve to which it may be adapted.

It is evident that the shape of the hooks and the location of the pin must be carefully worked out with reference to the cam in order to secure their engagement and disengagement in the manner set forth. The device, is, however, extremely simple, and adds so little to the cost of a turbine that the expense is practically negligible. Yet it positively removes the danger of sticking valve stems, in a manner which is entirely reliable, is continuously in operation, requires no adjustment, and needs very little attention.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:—

1. Valve mechanism for elastic fluid turbines comprising a plurality of valves biased to closed position, levers for operating the valves, cams for moving the levers to open the valves, and means carried by the cams for engaging the levers to positively close the valves in case any of them should remain open against the biasing force when the cams are moved to permit them to close.

2. Valve mechanism for elastic fluid turbines, comprising a lifting lever for the valve, a cam for moving the lever to open the valve, and a means carried by the cam and normally inactive for engaging the lever and positively moving it to seat the valve.

3. Valve mechanism for elastic fluid turbines, comprising a valve, an operating lever therefor, a closing spring, a cam for moving the lever to open the valve against the spring, a valve closing device carried by the lever, and a means carried by the cam adapted to engage the valve closing device at a predetermined point in its travel and coöperate with the spring to close the valve.

4. Valve mechanism for elastic fluid turbines, comprising a lifting lever provided with a hook, and a cam for actuating said lever having a pin adapted to engage with said hook.

5. Valve mechanism for elastic fluid turbines comprising a cam shaft, a plurality of cams thereon, a pin projecting laterally from each cam, a plurality of lifting levers, and a hook on each lever, the circular path of movement of the pins intersecting that of the hooks.

6. Valve mechanism for elastic fluid turbines comprising a cam shaft, a plurality of cams thereon, a pin projecting laterally from each cam, a plurality of lifting levers and a hook on each lever, the circular path of movement of the pins intersecting that of the hooks, and said pins being so located as to pass in advance of said hooks when the cams are rotating forward, and to engage with and push down said hooks when the cams turn backward and continue their rotation without further obstruction.

7. In a valve mechanism for elastic fluid turbines, the combination of a valve, a lifting lever for the valve comprising two arms, a cam for moving said arms to open the valve, a hook on each arm, and a projecting pin on the cam for engaging the hooks.

8. In a valve mechanism for elastic fluid turbines, the combination of a valve, an operating lever therefor, means for biasing the valve to closed position, a cam for moving the lever to open the valve, and means carried by the cam which engages the lever to positively close the valve in case it should remain open against its biasing means when the cam is moved to permit it to close.

In witness whereof, I have hereunto set my hand this 11th day November 1914.

WILLIAM F. VAN HOESEN.

Witnesses:
BENJAMIN B. HULL,
HELEN ORFORD.